(12) United States Patent
Chen

(10) Patent No.: US 6,771,571 B2
(45) Date of Patent: Aug. 3, 2004

(54) STORAGE/RETRIEVAL DEVICE FOR OPTICAL DISKS

(75) Inventor: Chiu-Yuan Chen, Chung-Ho (TW)

(73) Assignee: Dacal Technology Corp., Taipei (TW)

( * ) Notice: Subject to any disclaimer, the term of this patent is extended or adjusted under 35 U.S.C. 154(b) by 459 days.

(21) Appl. No.: 09/954,114

(22) Filed: Sep. 11, 2001

(65) Prior Publication Data

US 2003/0048701 A1 Mar. 13, 2003

(51) Int. Cl.[7] .............................................. G11B 17/22
(52) U.S. Cl. .................................................. 369/30.33
(58) Field of Search ........................... 369/30.33, 30.86, 369/30.87

(56) References Cited

U.S. PATENT DOCUMENTS 5,721,715 A * 2/1998 Mitani et al. ............ 369/30.32
5,953,293 A * 9/1999 Kajiyama et al. ........ 369/30.86
6,556,519 B1 * 4/2003 Shiomi .................... 369/30.86

* cited by examiner

Primary Examiner—George J. Letscher
(74) Attorney, Agent, or Firm—Pro-Techtor International Services

(57) ABSTRACT

A storage/retrieval device for optical disk comprises a casing and a disk shelf rotatably mounted in the casing, the disk shelf comprising plural storage grooves each for receiving an optical disk. An ejecting/placing mechanism is mounted in the casing for proceeding with storage/retrieval of the optical disk. A control/display device is operably connected to a drive device for driving the disk shelf to turn. The control/display device comprises a detecting circuit for detecting a position of an associated one of the storage grooves of the disk shelf for receiving the optical disk to be stored/retrieved. The optical disk is automatically ejected out of the casing via a window in the casing from the associated one of the storage grooves of the disk shelf or placed into the associated one of the storage grooves of the disk shelf upon opening of the window of the casing.

13 Claims, 8 Drawing Sheets

STORAGE/RETRIEVAL DEVICE FOR OPTICAL DISKS

BACKGROUND OF THE INVENTION

1. Field of the Invention

The present invention relates to a storage/retrieval device for optical disks.

2. Description of the Related Art

Rapid development and use of electric digital data require high-capacity storage media such as optical disks for storing huge information relating to a wide variety of fields such as music, pictures, images, texts, and engineering that are encountered in work or entertainment. Thus, operational convenience and reliable storage/retrieval of the frequently used high-capacity optical disks have become an important subject in view of the increasing use and the increasing types of the optical disks.

SUMMARY OF THE INVENTION

An object of the present invention is to provide a storage/retrieval device that proceeds with storage and retrieval of optical disks via a fixed window, and the required optical disk is automatically ejected without the action of searching and clamping.

Another object of the present invention is to provide a storage/retrieval device for optical disks, wherein each optical disk is stored or retrieved via a single window to thereby provide a better protection of the storage device for storing the optical disks.

A further object of the present invention is to provide a storage/retrieval device for optical disks, wherein the respective optical disk to be retrieved is automatically ejected without searching action and without touching the other optical disks.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
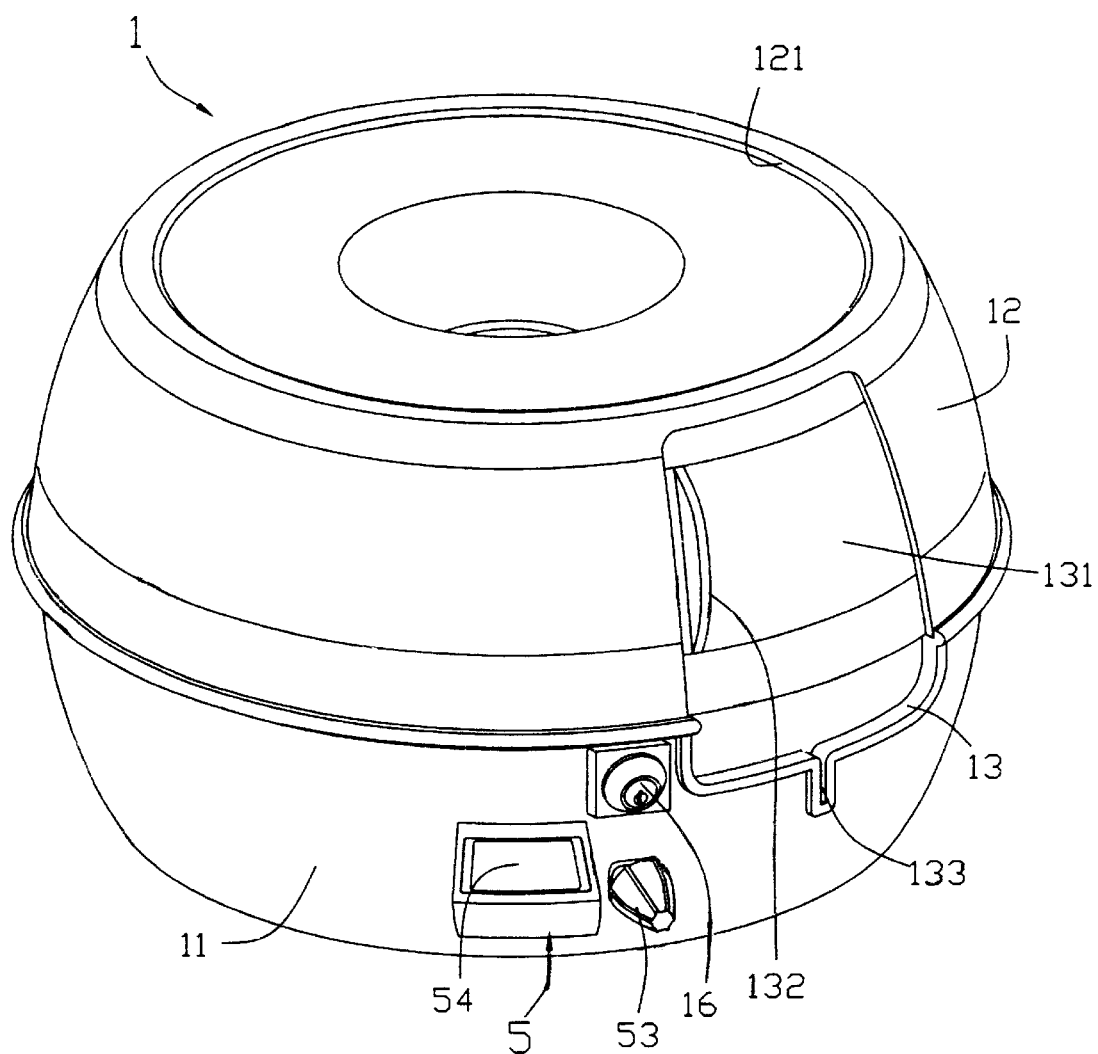
FIG. 1 is a perspective view of a storage/retrieval device for optical disks in accordance with the present invention.
Figure 4:
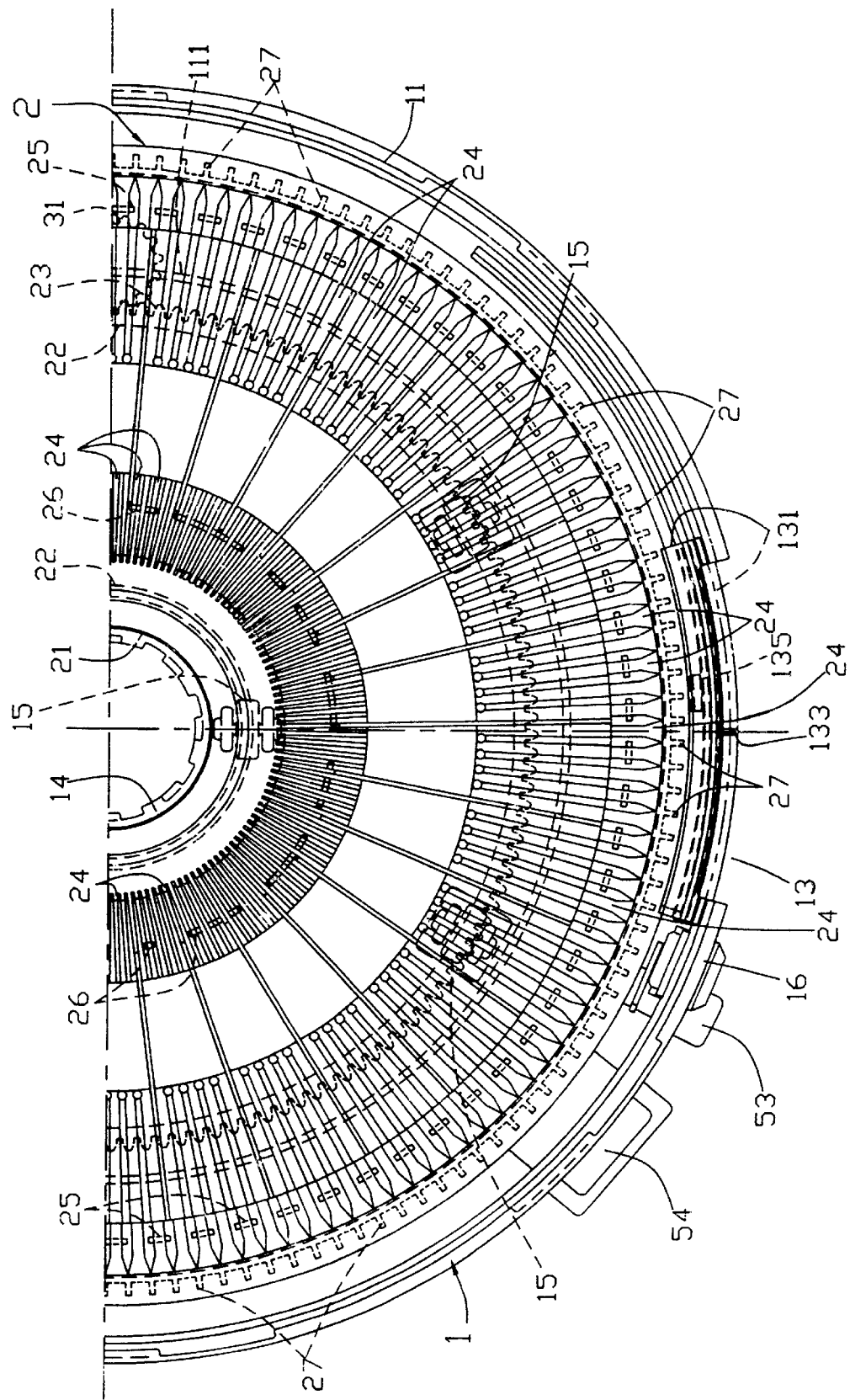
FIG. 4 is a top view of a disk shelf of the storage/retrieval device in accordance with the present invention.
Figure 5:
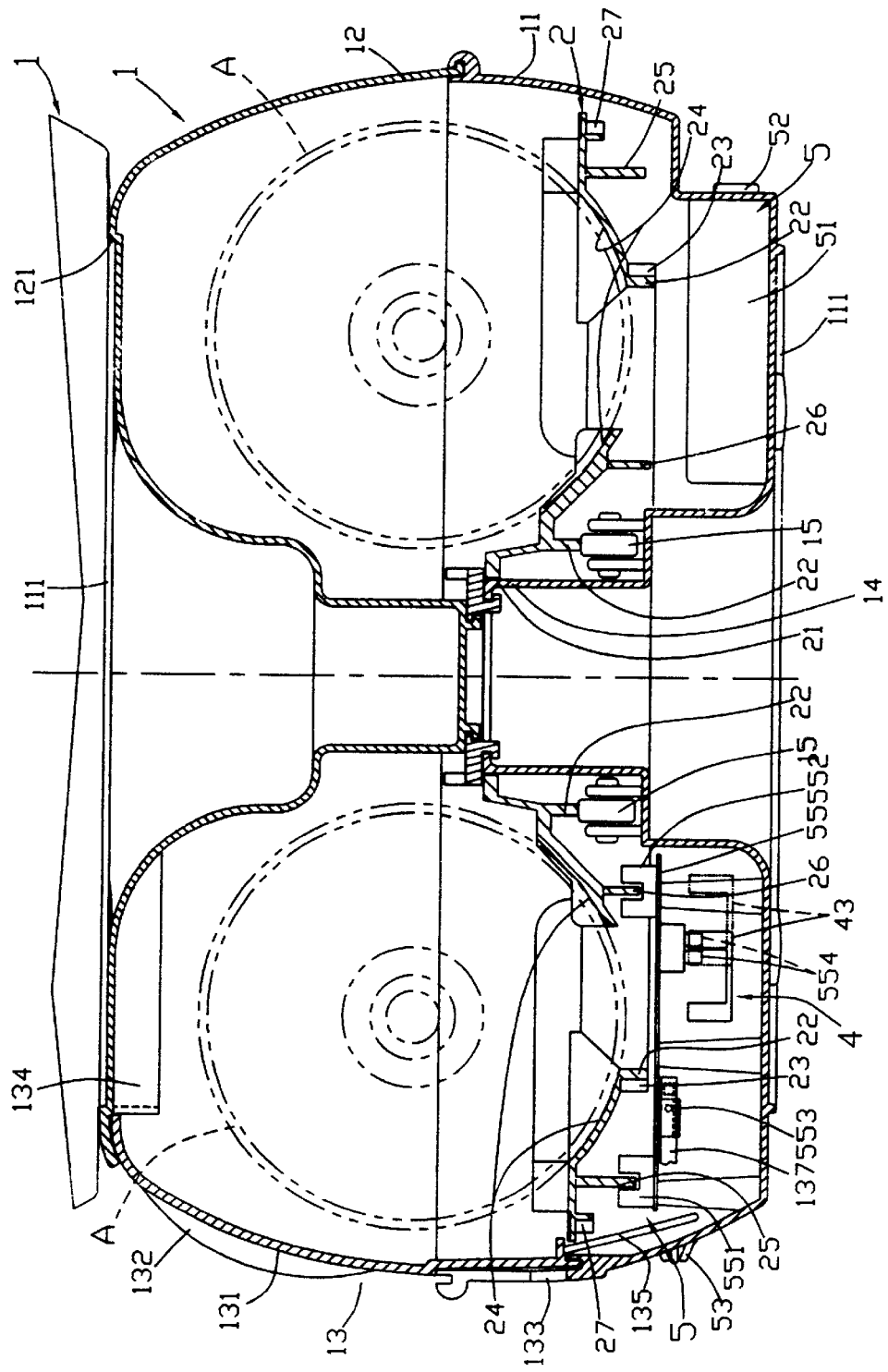
FIG. 5 is a sectional view, taken along line V—V in FIG. 2, of the storage/retrieval device in accordance with the present invention.
Figure 6:
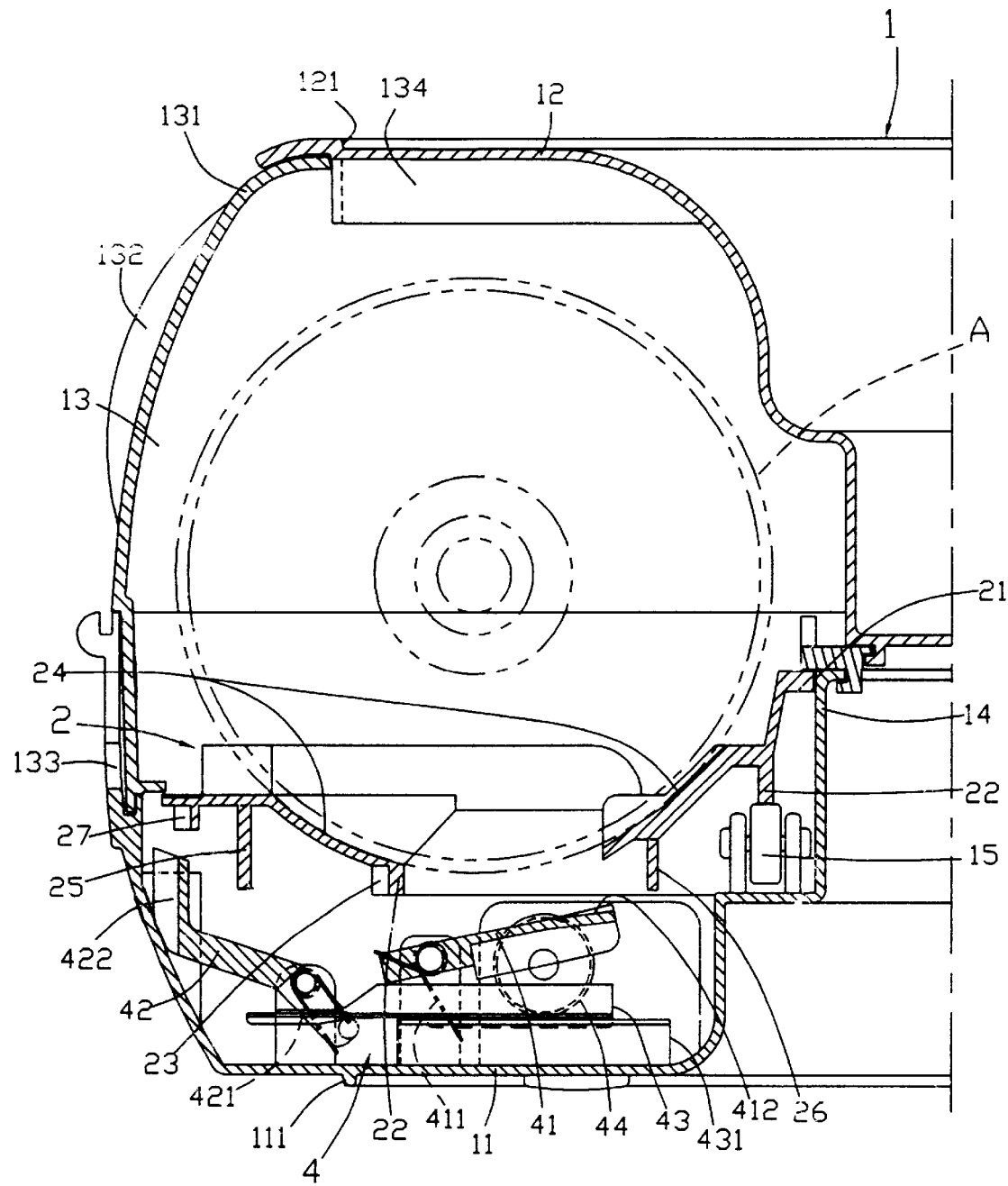
FIG. 6 is a sectional view, taken along line VI—VI in FIG. 2 of the storage/retrieval device in accordance with the present invention.
Figure 7:
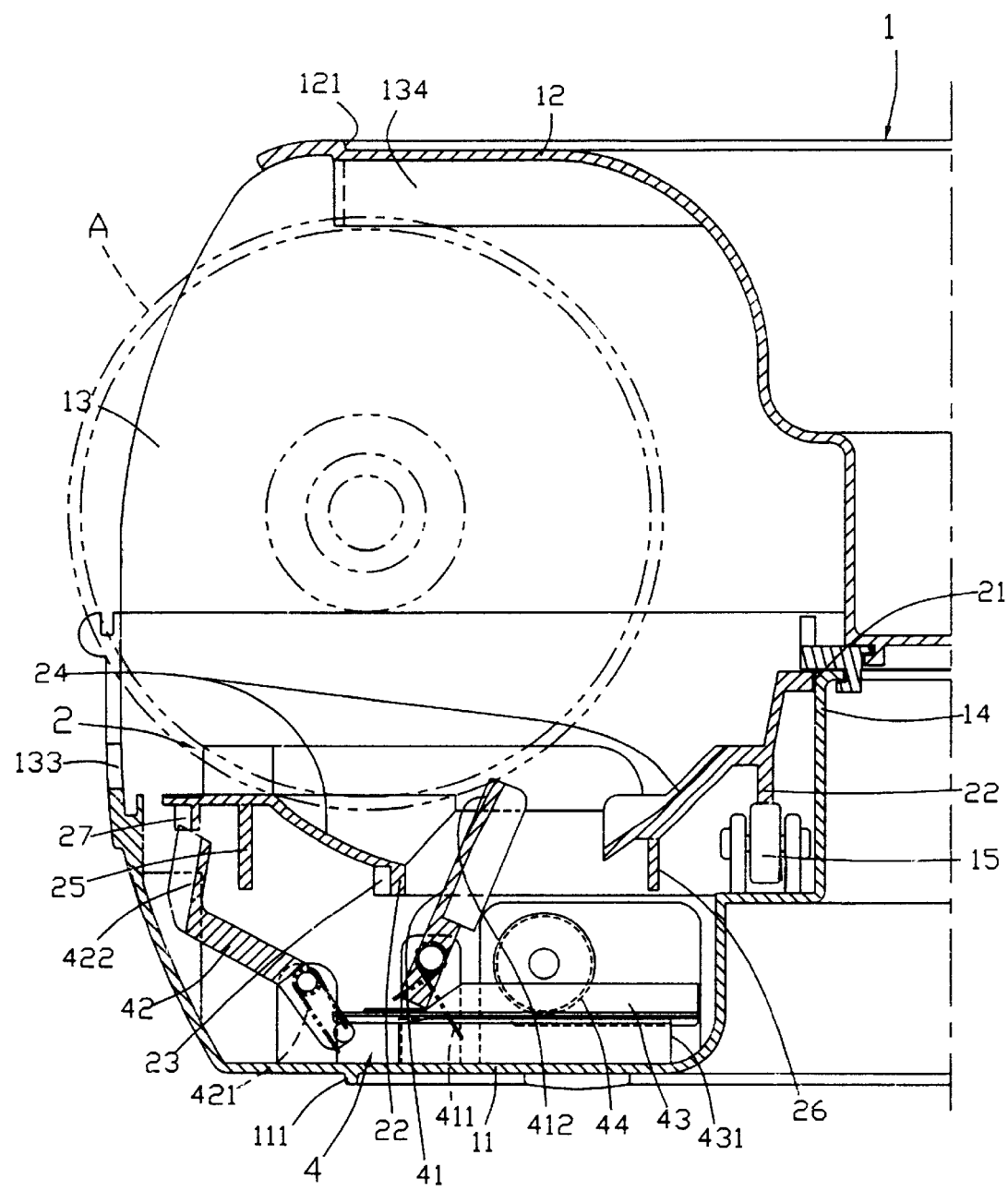
FIG. 7 is a sectional view similar to FIG. 6, illustrating retrieval operation of the storage/retrieval device in accordance with the present invention.
Figure 8:
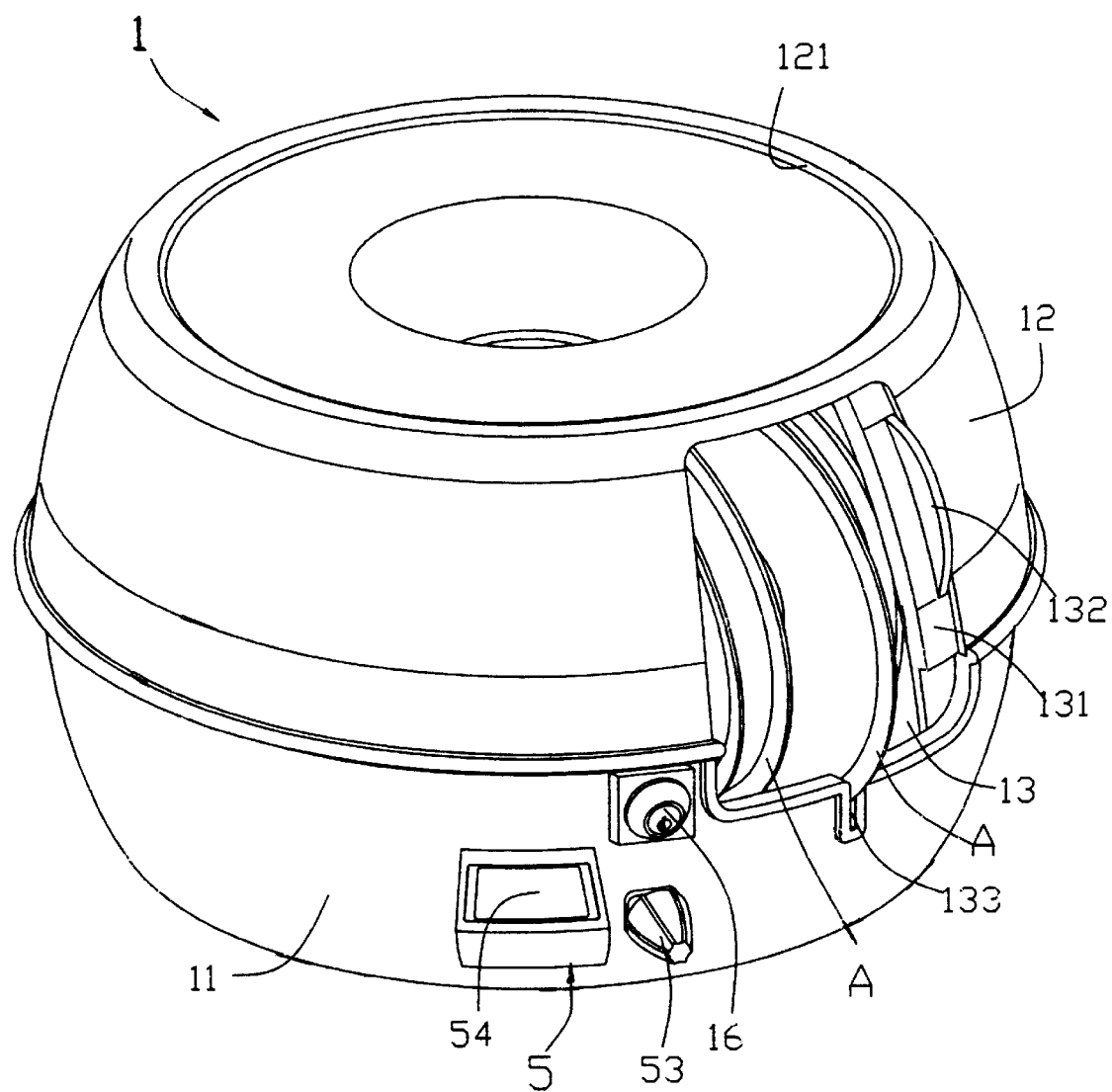
FIG. 8 is a perspective view illustrating retrieval operation of the storage/retrieval device in accordance with the present invention.

Referring to FIGS. 1 through 8 and initially to FIGS. 1 and 6, a storage/retrieval device for optical disks in accordance with the present invention generally includes a casing 1, a disk shelf 2, a drive means 3, an ejecting/placing mechanism 4, and a control/display means 5.

As illustrated in FIG. 1, the casing 1 comprises a thin base 11 and a thin cover 12 removably attached to enclose the thin base 11. The casing 1 farther comprises a window 13 having a lid 131 slidably mounted therein. A grip 132 is mounted to a side of the lid 131 for manually opening or closing the window 13. A channel 133 is defined in a bottom edge defining the window 13 and a guide groove 134 is defined in a top edge defining the window 13. Projections of the channel 133 and the guide channel 134 are on the same rectilinear track for guiding the retrieval movement of the optical disk A. In addition, an opening rod 135 is connected to the lid 131 for actuating a lever 137 that is biased by a torsion spring 136, thereby assuring opening of the window 13 for storage/retrieval of the optical disk A. A shallow recessed portion 121 is defined in a top of the cover 12 for receiving a flange 111 projecting from a bottom face of the base 11 of another storage/retrieval device, as shown in FIG. 5. This allows stacking of several storage/retrieval devices in accordance with the present invention.

Figure 2:
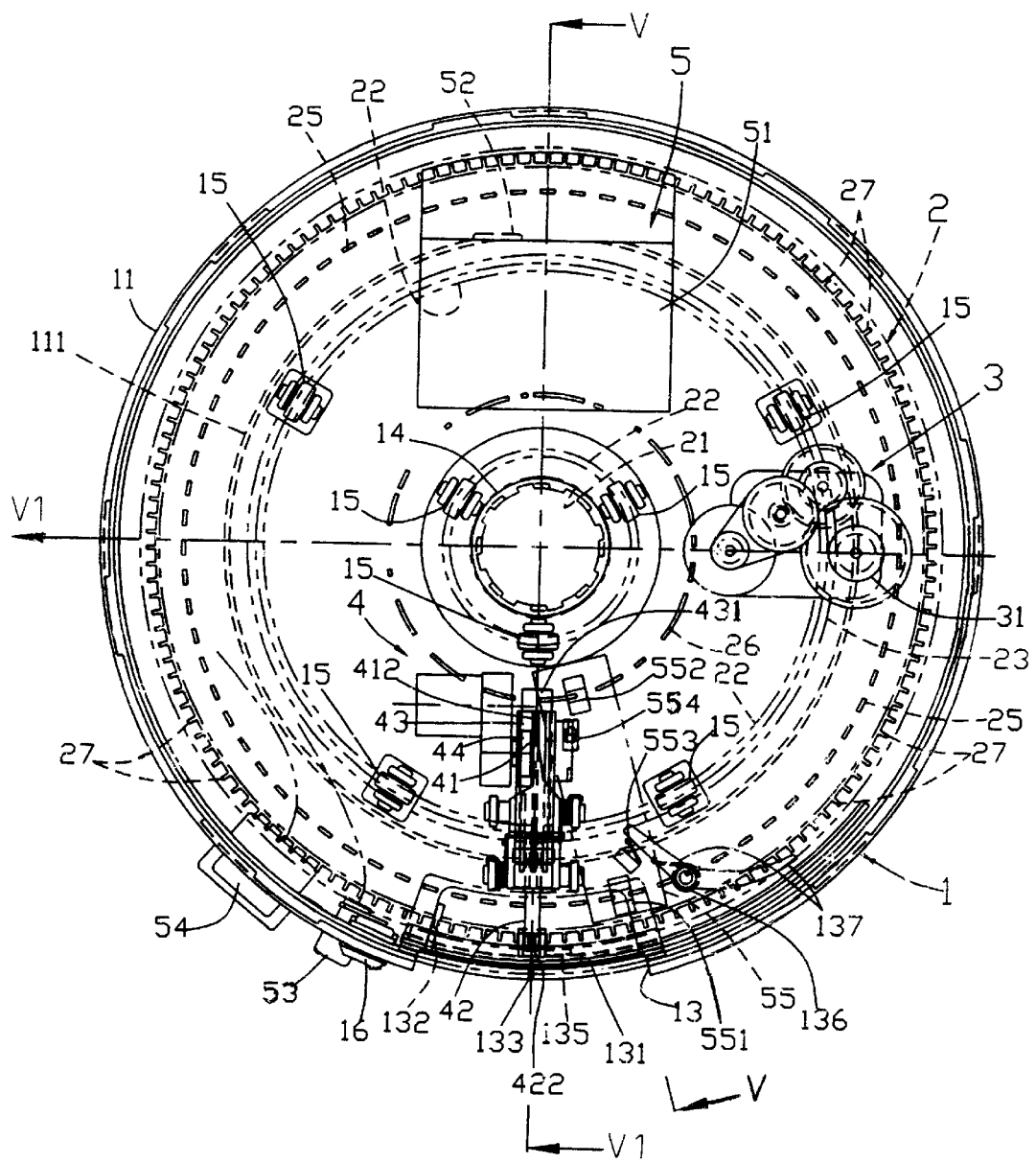
FIG. 2 is a top view of the storage/retrieval device in FIG. 1, wherein a cover of the storage/retrieval device is removed for clarity.
Figure 3:
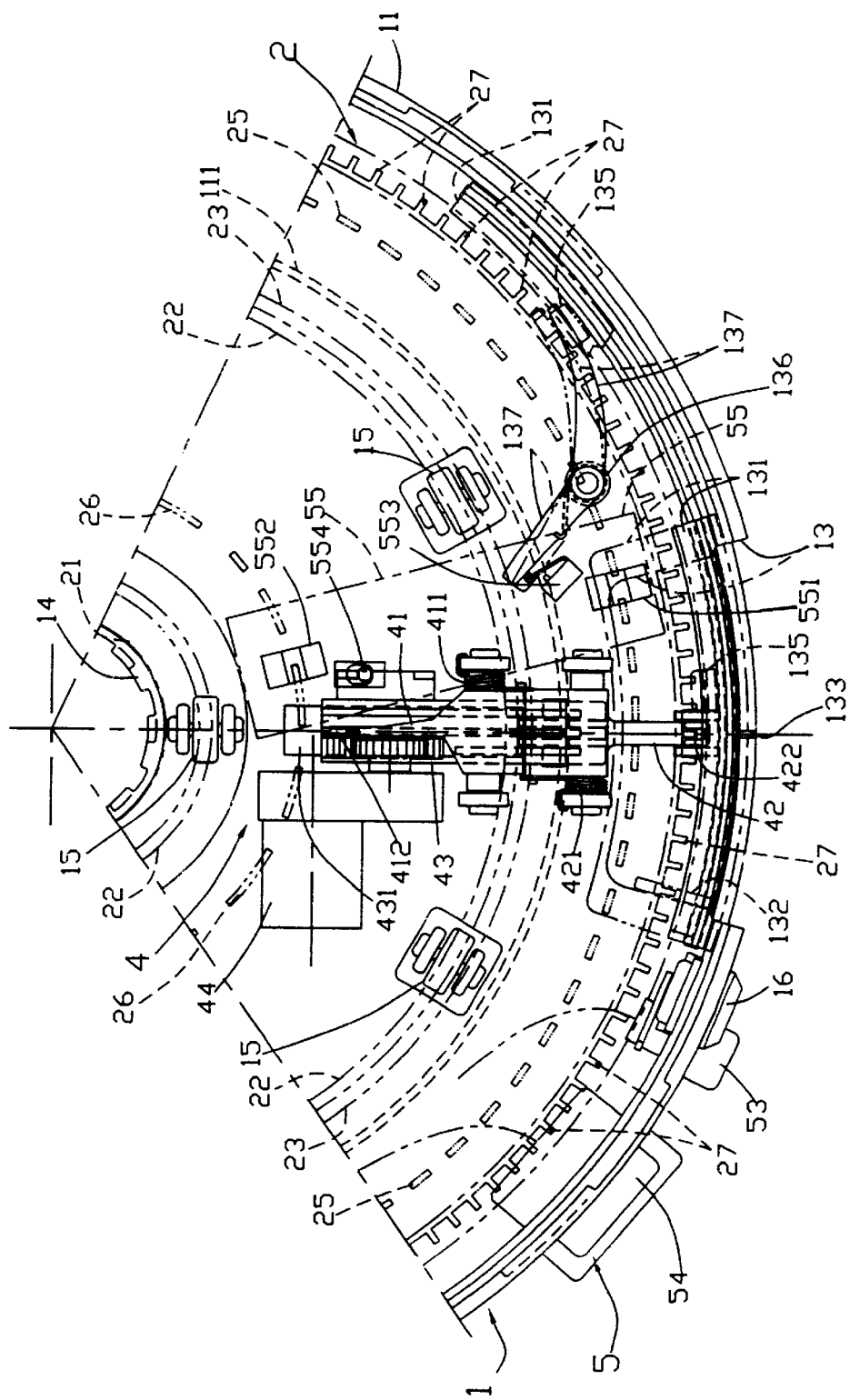
FIG. 3 is an enlarged view of a section of the storage/retrieval device in FIG. 2.

The disk shelf 2 comprises a central hole 21 so as to be rotatably mounted around a central axle 14 of the base 11, which, in turn, engages with the cover 12. In addition, plural wheels 15 are rotatably mounted on the base 11 for supporting a rack 22 on an underside of the disk shelf 2 to thereby allow the disk shelf 2 to rotate, as shown in FIGS. 2, 3, 4, and 6. The drive means 3 comprises a reduction/drive gear 31 that meshes a ring gear 23 provided on the underside of the disk shelf 2 for turning the disk shelf 2, as shown in FIGS. 4 and 6. A plurality of radially extending storage grooves 24 are arranged at intervals in a top face of the disk shelf 2 for receiving optical disks A. Concentrically formed on the underside of the disk shelf 2 are a plurality of annularly spaced position detecting plates 25 and a plurality of annularly spaced section detecting plates 26 that respectively correspond to the positions of the storage grooves 24 for receiving the optical disks A, as shown in FIGS. 2 and 6. In addition, a plurality of holding plates 27 respectively corresponding to the positions of the storage grooves 24 are provided on a bottom face of a rim of the disk shelf 2.

The ejecting/placing mechanism 4 comprises an ejecting/placing rod 41 pivotally attached to the base 11 of the casing 1 and located below the guide groove 134, a positioning rod 42 pivotally mounted to the casing 1 at a point below the channel 133 of the window 13, a drive plate 43 slidably engaged on a rail 431, the drive plate 43, the ejecting/placing rod 41, and the positioning rod 42 being movable along a line aligned with the channel 133 of the window 13, a reduction/driving means 44 operably connected to the drive plate 43 for driving the positioning rod 42 and the ejecting/placing rod 41 in sequence.

A torsion spring 411 is mounted around the ejecting/placing rod 41 to bias the latter toward the channel 133. Another torsion spring 421 is mounted around the positioning rod 42 to bias latter to engage with a respective holding plate 27 on the disk shelf 2. The reduction/driving means 44 drives the drive plate 43 to actuate the ejecting/placing rod 41 and the positioning rod 42 to move vertically. A holding groove 412 is defined in a side of the ejecting/placing rod 41 that is adjacent to the disk shelf 2 and has a thickness the same as that of an optical disk A. Further, the positioning rod 42 comprises a holding groove 422 for retaining the respective holding plate 27 in place such that the respective storage groove 24 on the disk shelf 2 that reaches its position is retained right above the holding groove 412 of the ejecting/placing rod 41.

The control/display means 5 comprises a control circuit 51 that is electrically connected to a power socket 52, a knob 53 operably connected to the control circuit 51, a display 54 mounted on the casing 1, and a detecting circuit 55. The detecting circuit 55 comprises a plurality of detectors 551 securely, respectively mounted corresponding to the positions of the annularly spaced position detecting plates 25 on the disk shelf 2, a plurality of sensors 552 respectively mounted corresponding to the positions of the annularly spaced section detecting plates 26, a microswitch 553 mounted in a position activatable by an action of the lever 137 actuated by the opening rod 135 as a result of opening of the lid 131, and a limit switch 554 mounted in a position associated with the vertical movement of the ejecting/placing rod 41 and the positioning rod 42 actuated by the drive plate 43 of the ejecting/placing mechanism 4 to thereby proceed with safe and reliable sequential operation of the storage/retrieval of the optical disk A.

In use, when the lid 131 is closed, the opening rod 135 is disengaged from the lever 137 such that the microswitch 533 of the detecting circuit 55 is not pressed against. The power supplied to the reduction/driving means 44 of the ejecting/placing mechanism 4 is cut off. And the drive plate 43 is located in a position corresponding to a lowered position of the ejecting/placing rod 41 and the positioning rod 42. The drive plate 43 presses against a contact of the limit switch 554 to thereby electrically connect with a power source for the drive means 3.

When the user intends to retrieve a specific optical disk A located in a specific position, the knob 53 is turned until the corresponding digital number associated with the specific optical disk A is shown on the display 54. The drive means 3 drives the disk shelf 2 to turn. The sensors 552 provide rapid detection of the corresponding section of the specific optical disk A in the disk shelf 2, and the detectors 551 provides exact detection of the exact position until the specific storing groove 24 aligns with the channel 133 of the window 13. Next, the lid 131 is opened by grasping the grip 132 and moving the lid 131 along the opening direction. The opening rod 135 actuates the lever 137 to press against the microswitch 553 of the detecting circuit 55, which, in turn, supplies power to the reduction/driving means 44 of the ejecting/placing mechanism 4. Namely, the drive plate 43 actuates the holding groove 422 of the positioning rod 42 to move upward for engaging with the respective holding plate 27 to thereby retain the disk shelf 2 in place. In addition, the limit switch 554 is pressed against by the drive plate 43 to thereby cut off the power supplied to the drive means 3 until another contact is touched. The drive plate 43 further urges the ejecting/placing rod 41 to move toward the specific optical disk A, which is thus received in the holding groove 412 of the ejecting/placing rod 41. The ejecting/placing rod 41 moves farther until the optical disk A passes through the guide groove 134 and finally reaches the channel 133 for retrieval by the user, best shown in FIG. 7. At this time, no power is supplied to the drive means 3, as the limit switch 554 is not pressed against by the drive plate 43 that actuates the ejecting/placing rod 41 and the positioning rod 42. Thus, when the ejecting/placing rod 41 and the positioning rod 42 are in the elevated position, the drive means 3 cannot be operate to turn the disk shelf 2.

When storing an optical disk A into the storage/retrieval device in accordance with the present invention, after placing the optical disk A into the holding groove 412 of the ejecting/placing rod 41 via the channel 133, the knob 53 is pushed (not turned) to force the driving means 44 of the ejecting/placing mechanism 4 to move the ejecting/placing rod 41 and the positioning rod 42 downward, which, in turn, presses against the limit switch 554 to thereby supply power to the drive means 3. The optical disk A held by the ejecting/placing rod 41 is moved through the guide groove 134 of the window 13 into the associated storage groove 24 of the disk shelf 2. The lid 131 is then closed to complete the retrieval/storage operation. Alternatively, the knob 53 is turned for next retrieval.

For simple storage operation, if the storage groove 24 of the disk shelf 2 facing the channel 133 of the window 13 is empty, the lid 131 can be moved to the open position for immediate storage of an optical disk without turning the knob 52. If the storage groove 24 of the disk shelf 2 facing the channel 133 of the window 13 is not empty, the knob 52 is turned until an empty storage groove 24 of the disk shelf 2 faces the channel 133 of the window 13. The knob 52 is then pushed to lower the positioning rod 42 and the ejecting/placing rod 41 for subsequent insertion of the optical disk A into the empty storage groove 24. A lock 16 may be provided to the base 11 of the casing 1 at a position adjacent to the lid 131 for locking the lid 131 in place to prevent unauthorized access of the optical disks.

According to the above description, it is appreciated that the optical disk can be stored or retrieved via a single window and the specific optical disk can be automatically ejected without searching. In addition, the other optical disks will not be touched during the automatic ejection of the specific optical disk without the need of searching. A simple, quick storage/retrieval operation of the optical disk is thus provided.

Although the invention has been explained in relation to its preferred embodiment, it is to be understood that many other possible modifications and variations can be made without departing from the scope of the invention as hereinafter claimed.

What is claimed is:

1. A storage/retrieval device for optical disks, comprising:
   a casing comprising a window;
   a disk shelf rotatably mounted in the casing, the disk shelf comprising a plurality of storage grooves each for receiving an optical disk;
   a drive means for driving the disk shelf to turn;
   an ejecting/placing mechanism mounted in the casing for proceeding with storage/retrieval of the optical disk; and
   a control/display means operably connected to the drive means for driving the disk shelf to turn, the control/display means comprising a detecting circuit for detecting a position of an associated one of the storage grooves of the disk shelf for receiving the optical disk to be stored/retrieved, the optical disk being automatically ejected out of the casing via the window from the associated one of the storage grooves of the disk shelf or placed into the associated one of the storage grooves of the disk shelf upon opening of the window of the casing, wherein
   the casing comprises a base and a cover removably attached to enclose the base, further comprising plural wheels rotatably mounted on the base, the display shelf comprising a rack formed on an underside thereof, the rack being supported by said plural wheels, thereby allowing the disk shelf to rotate, a plurality of annularly spaced position detecting plates and a plurality of annularly spaced section detecting plates being concentrically formed on the underside of the disk shelf and respectively corresponding to positions of the storage grooves, the disk shelf further comprising a rim having a bottom face, a plurality of holding plates being provided on the bottom face of the rim of the disk shelf and respectively corresponding to the positions of the storage grooves.

2. The storage/retrieval device for optical disks as claimed in claim 1, further comprising a lid slidably mounted in the window of the casing, the lid comprising a grip for manually opening or closing the window, a channel being defined in a bottom edge defining the window, a guide groove being defined in a top edge defining the window, projections of the channel and the guide channel being on a rectilinear track for guiding retrieval movement of the optical disk.

3. The storage/retrieval device for optical disk disks as claimed in claim 2, further comprising an opening rod operably connected to the lid, the detecting circuit of the control/display means comprising a plurality of detectors, wherein when the window is closed, the opening rod is in a position in which power supply to the drive means is cut off, and wherein when the window is opened, the opening rod is moved to another position allowing power supply to the drive means.

4. The storage/retrieval device for optical disk disks as claimed in claim 2, wherein the ejecting/placing mechanism comprises: an ejecting/placing rod pivotally mounted to the casing and located below the guide groove of the window, the ejecting/placing mechanism being biased by a first torsion spring toward the channel of the window; a positioning rod pivotally mounted in the casing at a point below the channel of the window, the positioning rod being biased by a second torsion spring to retain an associated one of the holding plates of the disk shelf;

a drive plate slidably engaged on a rail, the drive plate, the ejecting/placing rod, and the positioning rod being movable along a line aligned with the channel of the window; and a reduction/driving means operably connected to the drive plate for driving the positioning rod and the ejecting/placing rod in sequence.

5. The storage/retrieval device for optical disk disks as claimed in claim 4, wherein the ejecting/placing rod comprises a first holding groove in a side thereof that is adjacent to the disk shelf, the first holding groove having a thickness identical to that of the optical disk, the positioning rod comprising a second holding groove for engaging with an associated one of the holding plates to thereby retain the disk shelf in place such that an associated one of the storage grooves on the disk shelf is retained right above an associated one of the first holding groove of the ejecting/placing rod.

6. The storage/retrieval device for optical disk disks as claimed in claim 2, wherein the control/display means comprises a microswitch mounted in a position that is activatable by a lever that is actuatable by the opening rod as a result of opening of the window, the control/display means further comprising a limit switch mounted in a position associated with vertical movement of the ejecting/placing rod and the positioning rod to thereby proceed with safe and reliable sequential operation of the storage/retrieval of the optical disk.

7. The storage/retrieval device for optical disks as claimed in claim 1, the detecting circuit comprising a plurality of detectors securely, respectively mounted corresponding to positions of the annularly spaced position detecting plates on the disk shelf, the detecting circuit further comprising a plurality of sensors respectively mounted corresponding to positions of the annularly spaced section detecting plates on the disk shelf, the control/display means comprising a knob operably connected to the control circuit, a display mounted on the case for displaying a position of an associated one of the storage grooves of the disk shelf based on an angular position of the knob, the knob being operably connected to the drive means to turn the disk shelf when the knob is turned, the detectors and the sensors of the detecting circuit detecting one of the storage grooves that is associated with an angular position of the knob, the disk shelf being stopped when said one of the storage grooves associated with the angular position of the knob is aligned with the channel of the window.

8. A storage/retrieval device for optical disks, comprising:

a casing comprising a window;

a disk shelf rotatably mounted in the casing, the disk shelf comprising a plurality of storage grooves each for receiving an optical disk;

a drive means for driving the disk shelf to turn;

an ejecting/placing mechanism mounted in the casing for proceeding with storage/retrieval of the optical disk;

a control/display means operably connected to the drive means for driving the disk shelf to turn, the control/display means comprising a detecting circuit for detecting a position of an associated one of the storage grooves of the disk shelf for receiving the optical disk to be stored/retrieved, the optical disk being automatically ejected out of the casing via the window from the associated one of the storage grooves of the disk shelf or placed into the associated one of the storage grooves of the disk shelf upon opening of the window of the casing; and a lid slidably mounted in the window of the casing, the lid comprising a grip for manually opening or closing the window, a channel being defined in a bottom edge defining the window, a guide groove being defined in a top edge defining the window, projections of the channel and the guide channel being on a rectilinear track for guiding retrieval movement of the optical disk; wherein the ejecting/placing mechanism comprises: an ejecting/placing rod pivotally mounted to the casing and located below the guide groove of the window, the ejecting/placing mechanism being biased by a first torsion spring toward the channel of the window; a positioning rod pivotally mounted in the casing at a point below the channel of the window, the positioning rod being biased by a second torsion spring to retain an associated one of the holding plates of the disk shelf;

a drive plate slidably engaged on a rail, the drive plate, the ejecting/placing rod, and the positioning rod being movable along a line aligned with the channel of the window; and a reduction/driving means operably connected to the drive plate for driving the positioning rod and the ejecting/placing rod in sequence.

9. The storage/retrieval device for optical disk as claimed in claim 8, further comprising an opening rod operably connected to the lid, the detecting circuit of the control/display means comprising a plurality of detectors, wherein when the window is closed, the opening rod is in a position in which power supply to the drive means is cut off, and wherein when the window is opened, the opening rod is moved to another position allowing power supply to the drive means.

10. The storage/retrieval device for optical disk as claimed in claim 8, wherein the casing comprises a base and a cover removably attached to enclose the base, further comprising plural wheels rotatably mounted on the base, the display shelf comprising a rack formed on an underside thereof, the rack being supported by said plural wheels, thereby allowing the disk shelf to rotate, a plurality of annularly spaced position detecting plates and a plurality of annularly spaced section detecting plates being concentrically formed on the underside of the disk shelf and respectively corresponding to positions of the storage grooves, the disk shelf further comprising a rim having a bottom face, a plurality of holding plates being provided on the bottom face of the rim of the disk shelf and respectively corresponding to the positions of the storage grooves.

11. The storage/retrieval device for optical disk as claimed in claim 8, wherein the ejecting/placing rod comprises a first holding groove in a side thereof that is adjacent to the disk shelf, the first holding groove having a thickness identical to that of the optical disk, the positioning rod comprising a second holding groove for engaging with an associated one of the holding plates to thereby retain the disk shelf in place such that an associated one of the storage grooves on the disk shelf is retained right above an associated one of the first holding groove of the ejecting/placing rod.

12. The storage/retrieval device for optical disk as claimed in claim 8, the detecting circuit comprising a plurality of detectors securely, respectively mounted corresponding to positions of the annularly spaced position detecting plates on the disk shelf, the detecting circuit further comprising a plurality of sensors respectively mounted corresponding to positions of the annularly spaced section detecting plates on the disk shelf, the control/display means comprising a knob operably connected to the control circuit, a display mounted on the case for displaying a position of an associated one of the storage grooves of the disk shelf based on an angular position of the knob, the knob being operably connected to the drive means to turn the disk shelf when the knob is turned, the detectors and the sensors of the detecting circuit detecting one of the storage grooves that is associated with an angular position of the knob, the disk shelf being stopped when said one of the storage grooves associated with the angular position of the knob is aligned with the channel of the window.

13. The storage/retrieval device for optical disk as claimed in claim 8, wherein the control/display means comprises a microswitch mounted in a position that is activatable by a lever that is actuatable by the opening rod as a result of opening of the window, the control/display means further comprising a limit switch mounted in a position associated with vertical movement of the ejecting/placing rod and the positioning rod to thereby proceed with safe and reliable sequential operation of the storage/retrieval of the optical disk.

\* \* \* \* \*